United States Patent [19]
Borgholte et al.

[11] Patent Number: 6,099,912
[45] Date of Patent: Aug. 8, 2000

[54] COATING AGENT ON THE BASIS OF A POLYACRYLATE RESIN CONTAINING AN HYDROXYL GROUP, AND ITS USE IN A METHOD OF PRODUCING A MULTIPLE-LAYER PAINT COATING

[75] Inventors: Harald Borgholte; Heinz-Peter Rink, both of Münster; Werner-Alfons Jung, Ascheberg; Michael Brünnemann, Münster, all of Germany

[73] Assignee: BASF Coatings AG, Muenster-Hiltrup, Germany

[21] Appl. No.: 09/230,571

[22] PCT Filed: Jul. 3, 1997

[86] PCT No.: PCT/EP97/03514

§ 371 Date: Jan. 25, 1999

§ 102(e) Date: Jan. 25, 1999

[87] PCT Pub. No.: WO98/04642

PCT Pub. Date: Feb. 5, 1998

[30] Foreign Application Priority Data

Jul. 24, 1996 [DE] Germany ............................ 196 29 851

[51] Int. Cl.⁷ ................................ B05D 1/36; B05D 3/02
[52] U.S. Cl. ........................................ 427/407.1; 427/409
[58] Field of Search ...................................... 427/379, 409, 427/407.1

[56] References Cited

FOREIGN PATENT DOCUMENTS

WO 95/22582  8/1995  European Pat. Off. .
43 44 515 A1  12/1993  Germany .
4407415  9/1995  Germany .

Primary Examiner—Erma Cameron

[57] ABSTRACT

The present invention relates to a coating composition comprising at least one hydroxyl-containing polyacrylate resin as binder component (A) and at least one crosslinking agent (B), component (A) being obtainable by free-radical polymerization of:

(a) from 5 to 80% by weight of at least one cycloaliphatic ester of (meth)acrylic acid, (b) from 10 to 50% by weight of at least one hydroxyl-containing alkyl ester of (meth)acrylic acid, (c) from 1 to 25% by weight of at least one monomer having at least two polymerizable, olefinically unsaturated double bonds, (d) from 0 to 25% by weight of at least one further hydroxyl-containing monomer, (e) from 5 to 80% by weight of at least one aliphatic ester of (meth)acrylic acid, (f) from 0 to 40% by weight of at least one vinyl-aromatic compound, and (g) from 0 to 40% by weight of at least one further monomer, the sum of the proportions by weight of all monomers (a) to (g) always being 100% by weight.

The invention additionally embraces a process for producing a multicoat paint system using the novel coating composition and the use of the novel coating composition as topcoat, especially in automotive refinishing.

13 Claims, No Drawings

COATING AGENT ON THE BASIS OF A POLYACRYLATE RESIN CONTAINING AN HYDROXYL GROUP, AND ITS USE IN A METHOD OF PRODUCING A MULTIPLE-LAYER PAINT COATING

The application is the national stage of PCT/EP97/03514, filed Jul. 3, 1997.

FIELD OF THE INVENTION

The present invention relates to a coating composition comprising
(A) at least one hydroxyl-containing polyacrylate resin which is obtainable from
  (a) a cycloaliphatic ester of methacrylic acid and/or acrylic acid, or a mixture of such monomers,
  (b) a hydroxyl-containing alkyl ester of methacrylic acid and/or acrylic acid, or mixtures of such monomers,
  (c) a monomer having at least two polymerizable, olefinically unsaturated double bonds which is different from (a) and (b),
  (d) optionally a hydroxyl-containing, ethylenically unsaturated monomer which is different from (a), (b) and (c), or a mixture of such monomers,
  (e) an aliphatic ester of methacrylic acid and/or acrylic acid which is different from (a), (b), (c) and (d), or a mixture of such monomers,
  (f) optionally a vinyl-aromatic hydrocarbon which is different from (a), (b), (c), (d) and (e), or a mixture of such monomers, and
  (g) optionally a further ethylenically unsaturated monomer which is different from (a), (b), (c), (d), (e) and (f), or a mixture of such monomers,
and comprising
(B) at least one crosslinking agent.

The present invention additionally relates to processes for producing a multicoat protective and/or decorative coating on a substrate surface and to the use of the coating compositions in the sector of automotive refinishing.

BACKGROUND OF THE INVENTION

Coating compositions based on hydroxyl-containing polyacrylate resins and crosslinking agents are known, for example, from JP-A 4-1254. In that document, the hydroxyl-containing polyacrylate resins which are employed as binder are obtainable from hydroxyl-containing monomers, alkyl acrylates, alkyl methacrylates, optionally styrene and also optionally ethylenically unsaturated polymers. In that context it is essential to the invention that the polyacrylate resin has been prepared using 4-tert-butylcyclohexyl acrylate and/or 4-tert-butylcyclohexyl methacrylate as monomer component. The hydroxyl-containing monomer employed is, in particular, hydroxyethyl acrylate and/or hydroxyethyl methacrylate.

These coating compositions known from JP-A 4-1254, especially when used as a transparent topcoat over a basecoat film, have the particular disadvantage that, when hydroxyethyl acrylate and/or hydroxyethyl methacrylate are used as OH monomer, the resulting coatings are of inadequate adhesion to the basecoat film. A further disadvantage of these coating compositions known from JP-A 4-1254 is the inadequate pot life of the coating compositions.

EP-B-0 158 161 discloses hydroxyl-containing acrylate copolymers formed by copolymerization of acrylate monomers having at least two olefinically unsaturated double bonds, hydroxyl-containing monomers and further olefinically unsaturated monomers, which, together with melamine-formaldehyde resin as crosslinking agent, can be employed as coating compositions.

It is likewise a feature of these coating compositions known from EP-B-0 158 161 that, especially when used as transparent topcoat over a basecoat film, they have the disadvantage that, when hydroxyethyl (meth)acrylate is used as hydroxyl-containing monomer, they result in coatings with inadequate adhesion to the basecoat film and that the pot life of the coating compositions is inadequate.

EP-A-0 638 591 describes hydroxyl-containing copolymers which can be prepared by bulk polymerization in which one component is included in the initial charge at the beginning of polymerization, and in the subsequent course of polymerization at least two olefinically unsaturated monomers are added, at least one of which contains at least one carboxyl group and at least one is sterically hindered. Also described is the use of such copolymers in high-solids coating compositions. Again, the adhesion of such coating compositions according to EP-A-0 638 591 to basecoat films is inadequate.

DE-A-44 07 415 discloses coating compositions which provide an outstanding solution to the problems resulting from the prior art to date. Such coating compositions include (A) at least one hydroxyl-containing polyacrylate resin obtainable from (a) a cycloaliphatic ester of (meth)acrylic acid, (b) a hydroxyl-containing ester of (meth)acrylic acid, (c) optionally a hydroxyl-containing, ethylenically unsaturated monomer different from (a) and (b), (d) an aliphatic ester of (meth)acrylic acid different from (a), (b) and (c), (e) optionally a vinyl-aromatic hydrocarbon different from (a), (b), (c) and (d), and (f) optionally a further ethylenically unsaturated monomer different from (a), (b), (c), (d) and (e), and (B) at least one crosslinking agent.

When used as transparent topcoats over a pigmented basecoat film, the coating compositions according to DE-A-44 07 415 exhibit markedly improved adhesion to the basecoat film coupled with good chemical resistance and good weathering resistance. The coating compositions can be cured fully at low temperatures and thus can be used for the sector of automotive refinishing, Even when the coating compositions are cured at these low temperatures, the coating compositions rapidly attain full cure while at the same time retaining processability for a sufficiently long period. Moreover, the coating compositions of DE-A-44 07 415 have the advantage of a good topcoat holdout, exhibit very good flow under the conditions of automotive refinishing, have good application properties, and, when used as clearcoat over a basecoat film, cause only little dissolution of the latter.

Recent market requirements necessitate, however, a degree of adhesion which is improved again relative to the coating compositions of DE-A-44 07 415, when the coating compositions are employed as clearcoat for the coating of basecoat films, and increased gasoline resistance.

Problem and solution

The problem of the present invention was therefore to provide coating compositions which, when used as transparent topcoat over a pigmented basecoat film, lead to coatings having an adhesion to the basecoat which is improved relative to the coating compositions known from DE-A-44 07 415 and which have improved gasoline resistance relative to the coating compositions of DE-A-44 07 415. At the same time, the resulting coatings should be of good chemical resistance and good weathering resistance. In addition, the coating compositions should be suitable for automotive refinishing, i.e. they should be able to be cured fully at low temperatures of in general below 120 degrees C, preferably below 80 degrees C. Furthermore, the coating compositions should also attain rapid full cure (rapid dust dryness and freedom from tack and also rapid through-drying) at these low temperatures, while at the same time they should be processable for as long as possible (pot life). Moreover, the coating compositions should exhibit good topcoat holdout and, when used as clearcoat over a basecoat film, should cause only minimal dissolution of the underlying basecoat film and should exhibit a good light/dark effect when viewed at different angles. Finally, the coating compositions should show very good flow and should exhibit good application characteristics under the conditions of automotive refinishing.

This problem is surprisingly solved by a coating composition of the type specified at the outset which is characterized in that component (A) is a hydroxyl-containing polyacrylate resin which is obtainable by polymerizing preferably:
(a) from 5 to 80% by weight of component (a),
(b) from 10 to 50% by weight of component (b),
(c) from 1 to 25% by weight of component (c),
(d) from 0 to 25% by weight of component (d),
(e) from 5 to 80% by weight of component (e),
(f) from 0 to 40% by weight of component (f) and
(g) from 0 to 40% by weight of component (g)
to give a polyacrylate resin (A) having an OH number of from 60 to 180 mg of KOH/g, the sum of the proportions by weight of components (a) to (g) always being 100% by weight and the monomers or monomer mixtures employed as component (b) only being those which, on polymerization of the respective monomer alone, produce a polyacrylate resin and/or polymethacrylate resin having a glass transition temperature of from −10 to +6 degrees C or from +60 to 80 degrees C.

The present invention additionally relates to a process for producing a multilayer coating on a substrate surface using these coating compositions and to the use of the coating compositions in the sector of automotive refinishing.

It is surprising and was not foreseeable that the novel coating compositions, when used as transparent topcoat over a pigmented basecoat film, exhibit markedly improved adhesion to the basecoat film while at the same time having excellent gasoline resistance, good chemical resistance and good weathering resistance. A further advantage is that the coating compositions can be cured fully at low temperatures and thus can be employed for the sector of automotive refinishing. Even when the coating compositions are cured at these low temperatures the coating compositions rapidly attain full cure while at the same time retaining processability for a long period. Moreover, the novel coating compositions have the advantage of good topcoat holdout and, under the conditions of automotive refinishing, exhibit very good flow and good application properties. Finally, when used as clearcoat over a basecoat film, the novel coating compositions have the advantage that they cause only minimal dissolution of the basecoat film and exert only a very slight influence over the metallic effect.

DETAILED DESCRIPTION OF THE INVENTION

The constituents of the coating composition

In the text below, the individual constituents of the novel coating composition are described in more detail.

The polyacrylate resin (A)

The polyacrylate resin (A) which is employed in accordance with the invention is obtainable by polymerizing preferably (a) from 5 to 806 by weight, preferably from 5 to 30% by weight, of a cycloaliphatic ester of methacrylic acid and/or acrylic acid, or of a mixture of such monomers,
(b) from 10 to 50% by weight, preferably from 15 to 40% by weight, of a hydroxyl-containing alkyl ester of methacrylic acid and/or acrylic acid, or of a mixture of such monomers,
(c) from 1 to 25% by weight, preferably from 2 to 20% by weight, of a monomer having at least two polymerizable, olefinically unsaturated double bonds which is different from (a) and (b),
(d) from 0 to 25% by weight, preferably from 0 to 15% by weight, of a hydroxyl-containing, ethylenically unsaturated monomer which is different from (a), (b) and (c), or of a mixture of such monomers,
(e) from 5 to 80% by weight, preferably from 5 to 30% by weight, of an aliphatic ester of methacrylic acid and/or acrylic acid which is different from (a), (b), (c), (d) and (f), or of a mixture of such monomers,
(f) from 0 to 40% by weight, preferably from 10 to 30% by weight, of a vinyl-aromatic hydrocarbon which is different from (a), (b), (c), (d), (e) and (g), or of a mixture of such monomers, and
(g) from 0 to 40% by weight, preferably from 0 to 30% by weight, of a further ethylenically unsaturated monomer which is different from (a), (b), (c), (d), (e) and (f), or of a mixture of such monomers,
to give a polyacrylate resin (A) having an OH number of from 60 to 180, preferably from 100 to 150 mg of KOH/g, the sum of the proportions by weight of components (a) to (g) always being 100% by weight and the monomers or monomer mixtures employed as component (b) only being those which, on polymerization of the respective monomer alone, produce a polyacrylate resin and/or polymethacrylate resin having a glass transition temperature of from −10 to +6 degrees C or from +60 to 80 degrees C.

The polymerization of the monomer components (a) to (g) is preferably carried out with the exclusion of oxygen, for example by working in a nitrogen atmosphere. The reactor is equipped with appropriate stirring, heating and cooling devices and with a reflux condenser to retain volatile constituents, for example styrene. The polymerization reaction is carried out at temperatures of from 100 to 180 degrees C, preferably from 130 to 170 degrees C, using appropriate polymerization initiators and polymerization regulators.

Examples of suitable initiators for the preparation of the polyacrylate resins (A) are those containing tert-butyl groups, examples being di-tert-butyl peroxide, tert-butyl hydroperoxide, 2,2-di-tert-butyl peroxybutane and 1,3-bis-(tert-butylperoxyisopropyl-)-benzene, dibenzoyl peroxide, tert-butyl peroxy-2-ethylhexanoate, tert-butyl peroxy-3,5,5-trimethylhexanoate, tert-butyl peroxypivalate, tert-butyl peracetate, further peroxides, such as dicumyl peroxide, cumyl hydroperoxide, tert-amyl peroxybenzoate, tert-amyl peroxy-2-ethylhexanoate, diacyl peroxides, for example diacetyl peroxide, peroxyketals, 2,2-di-(tert-amylperoxy-)propane, ethyl 3,3-di-(tert-amylperoxy-)-butyrate, and thermally labile highly substituted ethane derivatives, based for example on silyl-substituted ethane derivatives and based on benzopinacol. It is also possible, furthermore, to employ aliphatic azo compounds, such as, for example, azoisovaleronitrile and azobiscyclohexane nitrile.

The quantity of initiator is in most cases from 0.1 to 8% by weight, based on the quantity of monomer to be processed, but may also be even higher if desired. The initiator, dissolved in a portion of the solvent employed for the polymerization, is metered in gradually during the polymerization reaction. The initiator feed preferably lasts about from 0.5 to 2 hours longer than the monomer feed, in order to obtain a good action during the after polymerization phase as well. If initiators having only a low decomposition rate under the prevailing reaction conditions are employed, then it is also possible to include the initiator in the initial charge.

The polymerization regulators employed if desired are used in quantities of preferably at least 0.5% by weight, particularly preferably at least 2.5% by weight, based on the overall weight of the monomers, the polyacrylate (A) being copolymerized to give a precrosslinked, ungelled product. Examples of polymerization regulators employed are compounds containing mercapto groups, or halogenated hydrocarbons.

The acid number of the polyacrylate resin (A) is usually between 0 and 30 mg of KOH/g.

The acid number of the polyacrylate resins which are employed in accordance with the invention can be adjusted by the person skilled in the art, by using appropriate quantities of component (g). Similar comments apply to the adjustment of the hydroxyl number. It can be controlled by way of the quantity of component (b) and (d) employed.

Examples of cycloaliphatic esters of acrylic acid and/or methacrylic acid which are suitable as component (a) are cyclohexyl acrylate, cyclohexyl methacrylate, 4-tert-butylcyclohexyl acrylate, 4-tert-butylcyclohexyl methacrylate, isobornyl acrylate and isobornyl methacrylate. As component (a) it is particularly preferred to employ 4-tert-butylcyclohexyl acrylate and/or 4-tert-butylcyclohexyl methacrylate.

It is essential to the invention that the monomers or monomer mixtures employed as component (b) are only those which, on polymerization of the respective monomer alone, produce a polyacrylate resin and/or polymethacrylate resin having a glass transition temperature of from −10 to +6 degrees C, or from +60 to −80 degrees C. This means that, when mixtures of different monomers are employed as component (b), appropriate mixtures of course include those which, on polymerization of component (b) alone, produce a polyacrylate resin and/or polymethacrylate resin having a $T_G$ value which is outside these ranges indicated for the individual monomers.

The glass transition temperature can be calculated approximately by a person skilled in the art with the aid of the formula $$\frac{1}{T_G} = \sum_{n=1}^{n=x} \frac{W_n}{T_{Gn}}$$

$T_G$=glass transition temperature of the polymer
x=number of different monomers incorporated by polymerization,
$W_n$=proportion by weight of the nth monomer
$T_{Gn}$=glass transition temperature of the homopolymer of the nth monomer.

Component (b) is preferably selected from 3-hydroxypropyl methacrylate, 3-hydroxypropyl acrylate, 2-hydroxypropyl methacrylate and/or 2-hydroxypropyl acrylate.

Other suitable hydroxyl-containing monomers (component (d)) are hydroxyalkyl esters of alpha,beta-unsaturated carboxylic acids having primary or secondary hydroxyl groups. If the acrylate copolymer is required to be of high reactivity, it is possible to employ exclusively hydroxyalkyl esters having primary hydroxyl groups; if the polyacrylate is to be less reactive, hydroxyalkyl esters containing secondary hydroxyl groups can be employed exclusively. Of course, mixtures of hydroxyalkyl esters containing primary hydroxyl groups and hydroxyalkyl esters containing secondary hydroxyl groups can also be used. Examples of suitable hydroxyalkyl esters of alpha,beta-unsaturated carboxylic acids containing primary hydroxyl groups are hydroxybutyl acrylate, hydroxyamyl acrylate, hydroxyhexyl acrylate, hydroxyoctyl acrylate and the corresponding methacrylates. Examples of hydroxyalkyl esters containing a secondary hydroxyl group which may be used are 2-hydroxybutyl acrylate, 3-hydroxybutyl acrylate and the corresponding methacrylates. It is of course possible as well in each case to employ the corresponding esters of other alpha, beta-unsaturated carboxylic acids, for example those of crotonic acid and of isocrotonic acid.

Advantageously, component (d) may at least in part be a reaction product of one mole of hydroxyethyl acrylate and/or hydroxyethyl methacrylate and on average two moles of epsilon-caprolactone. The component (d) employed may also be, at least in part, a reaction product of acrylic acid and/or methacrylic acid with the equivalent quantity of a glycidyl ester of a carboxylic acid having a tertiary alpha-carbon atom. Glycidyl esters of highly branched monocarboxylic acids are obtainable under the trade name "Cardura®". The reaction of the acrylic acid or methacrylic acid with the glycidyl ester of a carboxylic acid having a tertiary alpha-carbon atom can be carried out before, during or after the polymerization reaction.

As component (c) it is preferred to employ compounds of the general formula I:

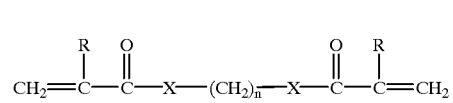

where:
R is H or methyl,
X is O, NH, $NR_1$ where $R_1$=C1- to C10-alkyl, or S and n are 2 to 8.

Examples of such compounds are hexanediol diacrylate, hexanediol dimethacrylate, glycol diacrylate, glycol dimethacrylate, butanediol diacrylate, butanediol dimethacrylate, and similar compounds.

Component (c) may also advantageously be a reaction product of a carboxylic acid containing a polymerizable, olefinically unsaturated double bond with glycidyl acrylate and/or glycidyl methacrylate or a poly- or monocarboxylic acid which is esterified with an unsaturated alcohol.

As component (c) it is additionally possible to employ aromatic compounds having at least 2 substituents, which contain polymerizable, olefinically unsaturated groups, preferably diallyl benzene or divinyl benzene.

It is also possible to use diallyl compounds as component (c).

Furthermore, it is possible with advantage to use, as component (c), a reaction product of a polyisocyanate with an unsaturated alcohol or with an unsaturated amine. An example hereof is the reaction product of 1 mol of hexamethylene diisocyanate and 2 mol of allyl alcohol.

Another advantageous component (c) is a diester of polyethylene glycol and/or polypropylene glycol having an average molecular weight of less than 1500, preferably less than 1000 daltons, with acrylic acid and/or methacrylic acid. In accordance with the invention it is also possible to employ as component (c) acrylates having more than two ethylenically unsaturated double bonds, such as, for example, trimethylolpropane triacrylate, trimethylolpropane trimethacrylate, pentaerythritol tetraacrylate or pentaerythritol tetramethacrylate. It is of course also possible to use combinations of these polyunsaturated monomers.

The monomers (e) employed in accordance with the invention are preferably selected such that polymerization of component (e) alone produces a polyacrylate resin and/or polymethacrylate resin having a glass transition temperature of from −70 to 120 degrees C.

Examples of monomers suitable as component (e) are methyl (meth)acrylate, ethyl (meth)acrylate, butyl (meth) acrylate, isopropyl (meth)acrylate, isobutyl (meth)acrylate, pentyl (meth)acrylate, isoamyl (meth)acrylate, hexyl (meth) acrylate, 2-ethylhexyl (meth)acrylate, furfuryl (meth) acrylate, octyl (meth)acrylate, 3,5,5,-trimethylhexyl (meth) acrylate, decyl (meth)acrylate isodecyl (meth)acrylate, lauryl (meth)acrylate, hexadecyl (meth)acrylate, octadecyl (meth)acrylate, stearyl (meth)acrylate and ethyltriglycol (meth)acrylate.

Suitable components (f) are vinyl-aromatic compounds. Component (f) preferably contains 8 to 9 carbon atoms per molecule. Examples of suitable compounds are styrene, vinyltoluenes, alpha-methylstyrene, chlorostyrenes, o-, m- or p-methylstyrene, 2,5-dimethylstyrene, p-methoxystyrene, p-tert-butylstyrene, p-dimethylaminostyrene, p-acetoamidostyrene and m-vinylphenol. Preference is given to employing vinyltoluenes and also, in particular, styrene.

Examples of compounds suitable as component (g) are unsaturated carboxylic acids, for example acrylic and/or methacrylic acid, maleic acid, fumaric acid, crotonic acid or isocrotonic acid, and also the anhydrides of these acids, alkoxyethyl acrylates, aryloxyethyl acrylates and the corresponding methacrylates, for example butoxyethyl (meth) acrylate and phenoxyethyl (meth)acrylate, and also methacrylonitrile and acrylonitrile, and also alkyl esters of other ethylenically unsaturated carboxylic acids, for example alkyl esters of crotonic and isocrotonic acid, and also polymerizable vinyl ethers and vinyl esters.

The novel coating compositions may additionally contain one or more other hydroxyl-containing resins, if desired. For example, they may contain further hydroxyl-containing acrylate resins which are different from the novel acrylate resin (A), and/or may contain polycondensation resins (especially polyester resin).

These other binders are usually employed in a quantity of from 0 to 25% by weight, preferably from 0 to 20% by weight, based in each case on the overall weight of the coating composition and based on the solids content of the binder.

Examples of suitable other binders are, for example, the polyacrylate resins which are commercially obtainable under the name Macrynal SM 510 and SM 513 from Hoechst, and also the hydroxyl-containing polyacrylate resins described in German Patent Application DE-A-40 24 204 and prepared in the presence of a polyester. For details, reference may be made to DE-A-40 24 204, especially page 3, line 18 to page 7, line 53.

A further suitable example of another binder is a hydroxyl-containing polyacrylate resin which is obtainable by polymerizing (m1) from 10 to 51% by weight of a mixture of
  (m11) one or more monomers selected from the group 4-hydroxy-n-butyl acrylate and/or 4-hydroxy-n-butyl methacrylate and/or 3-hydroxy-n-butyl acrylate and/or 3-hydroxy-n-butyl methacrylate and
  (m12) one or more monomers selected from the group 3-hydroxy-n-propyl acrylate and/or 3-hydroxy-n-propyl methacrylate and/or 2-hydroxy-n-propyl acrylate and/or 2-hydroxy-n-propyl methacrylate,
(m2) from 0 to 20% by weight of a hydroxyl-containing ester of acrylic acid or of methacrylic acid which is different from (m1) and has at least 5 carbon atoms in the alcohol residue, or of a mixture of such monomers,
(m3) from 28 to 85% by weight of an aliphatic or cycloaliphatic ester of acrylic acid or of methacrylic acid which is different from (m1) and (m2) and has at least 4 carbon atoms in the alc hol residue, or of a mixture of such monomers,
(m4) from 0 to 25% by weight of a vinyl-aromatic hydrocarbon which is different from (m1), (m2) and (m3), or of a mixture of such monomers,
(m5) from 0 to 5% by weight of an ethylenically unsaturated carboxylic acid or of a mixture of ethylenically unsaturated carboxylic acids, and
(m6) from 0 to 20% by weight of an ethylenically unsaturated monomer which is different from (ml), (m2), (m3), (m4) and (m5), or of a mixture of such monomers to give a polyacrylate resin having a hydroxyl number of from 60 to 200 mg of KOH/g, an acid number of 0 to 35 mg of KOH/g and a number-average molecular weight Mn of from 1000 to 5000 daltons, the sum of the proportions by weight of components (m1) to (m6) being in each case 100% by weight.

Examples of compounds suitable as monomer components (ml) to (m6) are the compounds listed in the description of the acrylate resin (A).

The crosslinking agent (B)

The polyisocyanate component preferably employed as crosslinking agent (B) comprises any desired organic polyisocyanate having free isocyanate groups attached to aliphatic, cycloaliphatic, araliphatic and/or aromatic structures. It is preferred to employ polyisocyanates having from 2 to 5 isocyanate groups per molecule. If desired, small quantities of organic solvent, preferably from 1 to 25% by weight based on pure polyisocyanate, may be added to the polyisocyanates so as to improve the ease of incorporation of the isocyanate. Examples of suitable solvent additives for the polyisocyanates are ethoxyethyl propionate, butylacetate and the like.

Examples of suitable isocyanates are described, for example, in "Methoden der organischen Chemie" [Methods of Organic Chemistry], Houben-Weyl, volume 14/2, 4th Edition, Georg Thieme Verlag, Stuttgart 1963, pages 61 to 70, and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, omega,omega'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3, 5,5-trimethylcyclohexyl isocyanate ("isophorone diisocyanate"), 2,5- and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis (isocyanato)-4,7-methanehexahydroindane [sic], dicyclohexyl2,4'- and 4,4'-diisocyanate, 2,4- and 2,6-hexahydrotolylene diisocyanate, perhydro 2,4'- and 4,4'-diphenylmethane diisocyanate, omega,omega'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'- dimethylbiphenyl, 4,4'-diisocyanato-3,3'-diphenylbiphenyl, 2,4'- and 4,4'-diisocyanatodiphenylmethane, naphthylene-1, 5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanatotriphenyl methane. Preference is given, in combination if desired with the abovementioned polyisocyanates, to polyisocyanates which contain isocyanurate groups and/or biuret groups and/or allophanate groups and/or urethane groups and/or urea groups. Polyisocyanates containing urethane groups, for example, are obtained by reacting some of the isocyanate groups with polyols, for example trimethylol propane and glycerol.

It is preferred to employ aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. It is very particularly preferred to employ mixtures of polyisocyanates containing uretdione and/or isocyanurate groups and/or allophanate groups, such polyisocyanates being based on hexamethylene diisocyanate and being as formed by catalytic oligomerization of hexamethylene diisocyanate using appropriate catalysts. The polyisocyanate component (B) may additionally comprise any desired mixtures of the polyisocyanates mentioned by way of example.

The quantity of the preferably employed crosslinking agent (B) is chosen such that the ratio of the isocyanate groups of the crosslinking agent to the hydroxyl groups of the binder component is in the range from 1:3 to 3:1. The novel coating compositions usually contain from 15 to 45% by weight of the acrylate resin (A), from 0 to 30% by weight of the further binder component and from 6 to 20% by weight of the crosslinking agent (B), based in each case on the overall weight of the coating composition and based on the solids content of the binder and crosslinking components.

The preparation and the use of the coating compositions

The novel coating compositions additionally contain one or more organic solvents. These solvents are customarily employed in quantities of from 20 to 70% by weight, preferably from 25 to 65% by weight, based in each case on the overall weight of the coating composition. Examples of suitable solvents are relatively highly substituted aromatic substances, examples being Solvent Naphtha®, heavy benzene, various Solvesso® grades, various Schellsol® glides and Deasol® and also relatively high-boiling aliphatic and cycloaliphatic hydrocarbons, for example various white spirits, mineral turpentine oil, tetralin and decalin, and also various esters, examples being ethylglycol acetate, butylglycol acetate, ethyldiglycol acetate and the like.

The novel coating compositions may additionally contain conventional auxiliaries and additives in conventional quantities, preferably from 0.01 to 10% by weight, based on the overall weight of the coating composition. Examples of suitable auxiliaries and additives are levelling agents, such as silicone oils, plasticizers, such as phosphates and phthalates, viscosity-controlling additives, matting agents, UV absorbers, light stabilizers, and, if desired, fillers.

The coating compositions are prepared in a known manner by mixing and, if desired, dispersing the individual components.

These coating compositions can be applied in the form of a film to a substrate by spraying, flow-coating, dipping, rolling, knife-coating or spreading, the film subsequently being cured to give a firmly adhering coating.

These coating compositions are conventionally cured at room temperature or slightly elevated temperature, advantageously at temperatures below 100 degrees C and preferably at temperatures below 80 degrees C. However, the coating compositions can also be cured under stoving conditions, i.e. at temperatures of at least 100 degrees C.

Suitable substrates are, in particular, metals and also wood, plastic, glass and the like.

Owing to the short curing times and low curing temperatures, the novel coating compositions are preferably used for automotive refinishing and the finishing of large vehicles and truck bodies. However, depending on the crosslinking agent employed they can also be utilized for the production-line finishing of automobiles.

Furthermore, they are suitable as pigment-containing solid-color paints and in particular, as clearcoats.

The present invention therefore also relates to a process for producing a multicoat protective and/or decorative coating on a substrate surface, in which (1) a pigmented basecoat is applied to the substrate surface,
(2) a polymer film is formed from the basecoat applied in stage (1),
(3) a transparent topcoat containing the novel polyacrylate resin (A) and a crosslinking agent (B) is applied to the basecoat thus obtained, and then
(4) basecoat film and topcoat film are cured together.

The basecoats employed in this process are known and therefore require no further description. Examples of suitable basecoats are also the basecoats described n DE-A-41 10 520, DE-A-40 09 000, in DE-A-40 24 204, EP-A-355 433, DE-A-35 45 618, DE-A-38 13 866 and DE-A-42 32 717.

Also suitable are the basecoats described in DE-A-43 27 416, which are characterized in that they contain a hydroxyl-containing polyester having a weight-average molecular weight Mw of from 40,000 to 200,000 daltons and a polydispersity Mw/Mn >8 and in that, in order to prepare the polyester, at least 50% by weight of aromatic dicarboxylic acids or esterifiable derivatives thereof has been employed, but where the content of phthalic anhydride is not more than 80% by weight and the percentages by weight are based in each case on the overall weight of the acid components employed to prepare the polyester.

The novel coating compositions are particularly notable for good adhesion to the basecoat film, good scratch resistance and high hardness of the resulting coatings. In addition the coating compositions exhibit rapid drying coupled with an ability to be processed for a long time (pot life). Moreover, the resulting coatings, especially in the case of clearcoats, display good mechanical properties such as, for example, good gloss retention, good fullness and good levelling.

The invention will now be explained in more detail with reference to working examples. In these examples, all parts and percentages are by weight unless expressly stated otherwise.

EXAMPLES

1. Preparation of the novel polyacrylate resin A1 and of further polyacrylate resins V1 and V2 (comparison examples)

The monomers employed to prepare the polyacrylate resin A1 (novel) and the polyacrylate resins V1, V2 (comparison) are indicated in Table 1. Among these monomers, the hydroxy-n-propyl (meth)acrylate employed is a commercially available mixture of 25% by weight of 3-hydroxy-n- propyl (meth)acrylate and 75% by weight of 2-hydroxy-n-propyl (meth)acrylate. The acrylate resins are prepared by placing 19.69 parts of Shellsol® A in a 4 liter reactor which is suitable for polymerization reactions and heating this initial charge to 145 degrees C. Into this initial charge there are metered, beginning simultaneously and added at a uniform rate, a mixture of the monomers indicated in Table 1 and in each case the indicated quantities of triisodecyl phosphite and mercaptoethanol, over the course of 4 hours and in 4.5 hours the initiator solution, consisting of an 18.3% strength solution of tert-butyl cumene peroxide in xylene. Following 2 hours of afterpolymerization, the batch was adjusted using 98% strength butyl acetate to a solids content of from about 60.0 to 63.0%. The properties of the resulting polyacrylate resins are shown in Table 2.

2. Preparation of the coating compositions containing the polyacrylate resins A1 (novel) and V1 and V2 (comparison)

2.1. Preparation of a solution containing the crosslinking agent B (hardener solution)

A hardener solution is prepared from the components indicated below by mixing:

| | |
|---|---|
| Butyl acetate 98% | 40.5 parts |
| Xylene | 4.0 parts |
| Butylglycol acetate | 6.0 parts |
| Catalyst solution | 1.5 parts |
| Desmodur ® Z 4370[1)] | 15.0 parts |
| Desmodur ® N 3390[2)] | 33.0 parts |
| Solids content (% by wt.) | 42.2 parts |

[1)]Commercial polyisocyanate from Bayer AG based on isophorone diisocyanate, having a solids content of 70% and an NCO content of 11%.
[2)]Commercial polyisocyanate from Bayer AG based on a hexamethylene diisocyanate trimer having an average functionality of between 3 and 4 and a uretdione group content of between 0 and 3% by weight, and also a solids content of 90% and an isocyanate content of 19.5%.

2.2. Preparation of an adjustment additive

An adjustment additive is prepared from the components indicated below by mixing:

| | |
|---|---|
| Xylene | 20.0 parts |
| Solventnaphta ® | 15.0 parts |
| Petroleum spirit 135/180 | 10.0 parts |
| Butylglycol acetate | 5.0 parts |
| Butyl acetate (98/100) | 50.0 parts |

2.3. Preparation of a catalyst solution 1.0 parts of dibutyltin dilaurate are mixed with 99.0 parts of butyl acetate 98/100.

2.4. Preparation of a levelling agent solution 5.0 parts of a commercial levelling agent based on a polyether-modified methylpolysiloxane (product Baysilone® OL 44 from Bayer AG) and 95.0 parts of xylene are mixed.

2.5. Preparation of the clearcoat solutions KA1 (novel) and KV1 and KV2 (comparison)

The clearcoat solutions are prepared from the components indicated in Table 3 by mixing.

2.6. Preparation of the transparent topcoats KA1' (novel) and KV1' and KV2' (comparison)

The transparent topcoats are prepared by mixing in each case 100 parts by volume of the clearcoat solutions KA1 and, respectively, KV1 and KV2 with 50 parts by volume of the above-described hardener solution according to Example 2.1 and 10 parts by volume of the above-described adjustment additive according to Example 2.2.

The coating material thus obtained is then applied to phosphatized and coated steel panels. For this purpose the phosphatized steel panels are coated by spraying with a conventional commercial filler (commercial product Glasurit Grundfüller [primer surfacer] EP 801-1552 from Glasurit GmbH, Munster, with an epoxy-functional binder and with an amino-functional hardener) (dry film thickness about 40 to 60 mm), dried at 80 degrees C for 45 minutes and at room temperature for 16 h and wet-sanded using P800 sandpaper and an eccentric sander. Subsequently, a basecoat is applied which comprises a mixture of 80 parts of a conventional commercial metallic basecoat (commercial product Basislack AE 54M 99/9 Basisfarbe Aluminium superfein from Glasurit GmbH, Münster) based on a hydroxyl-containing polyester, cellulose acetobutyrate, wax and a melamine resin, and 20 parts of a further conventional commercial basecoat (commercial product Basislack AE 54M 552 Basisfarbe Helioblau from Glasurit GmbH, Münster) based on a hydroxyl-containing polyester, cellulose acetobutyrate, wax and a melamine resin, by first of all applying one spray pass and, after an intermediate flash-off time of 5 minutes, applying a second spray pass (spray pressure in each case 4 to 5 bar). The dry film thickness of the basecoat is about 20 mm. After a flash-off time of 30 minutes the clearcoat is applied by first of all applying one spray pass and, after an intermediate flash-off time of 3 minutes, applying a second spray pass (spray pressure in each case 4 to 5 bar). The panels are then dried under different conditions, depending on the test carried out. The dry film thickness of the clearcoat is from about 50 to 80 mm.

The test results of the resulting coatings are shown in Table 4.

TABLE 1

Composition of components A1, V1 and V2

| | A1 | V1 | V2 |
|---|---|---|---|
| Styrene | 13.39 | 13.39 | 13.39 |
| n-butylmethacrylate | 3.49 | 3.49 | 3.49 |
| tert-butyl acrylate | — | — | 8.15 |
| tert-butylcyclohexylacrylate | 8.15 | 8.15 | — |
| Methyl methacrylate | 9.90 | 12.22 | 9.90 |
| Hydroxy-n-propyl methacrylate | 20.96 | 20.96 | 20.96 |
| Hexanediol diacrylate | — | — | 2.33 |
| Hexanediol dimethacrylate | 2.33 | — | — |
| Mercaptoethanol | 0.29 | 0.29 | 0.29 |
| Triisodecyl phosphite | 0.15 | 0.15 | 0.15 |

TABLE 2

Properties of the polyacrylate resins A1, V1 and V2

| | A1 | V1 | V2 |
|---|---|---|---|
| OH number [mg of KOH/g] | 140 | 140 | 140 |
| Acid number [mg of KOH/g] | 4.3 | 2.0 | 4.5 |
| Fluids content [%] | 62.6 | 60.0 | 60.1 |
| Viscosity[1)] [dPas] | 5.5 | 2.5 | 5.5 |

[1)]Viscosity of a 50% strength solution of the polyacrylate resin in butyl acetate at 23 degrees C.

TABLE 3

Composition of the clearcoat solutions in parts by weight

|  | KA1 | KV1 | KV2 |
|---|---|---|---|
| A1[1] | 87.0 | — | — |
| V1[1] | — | 87.0 | — |
| V2[1] | — | — | 87.0 |
| LS1[2] | 0.9 | 0.9 | 0.9 |
| LS2[3] | 0.9 | 0.9 | 0.9 |
| DBTL[4] | 2.0 | 2.0 | 2.0 |
| LAS[5] | 3.8 | 3.8 | 3.8 |
| BGA[6] | 2.4 | 2.4 | 2.4 |
| BA[7] | 3.0 | 3.0 | 3.0 |
| SC (%)[8] | 52.2 | 52.2 | 52.2 |

Key to Table 3
[1] Solutions, described in Table 1, of the polyacrylates A1 and V1 and V2, all of which have however been adjusted with butyl acetate to a uniform solids content of 58%
[2] Tinuvin ® 292 from Ciba Geigy, commercial light stabilizer based on a sterically hindered amine (HALS)
[3] Tinuvin ® 1130 from Ciba Geigy, commercial light stabilizer based on benzotriazole
[4] Catalyst solution described under Section 2.3.
[5] Leveling agent solution described under Section 2.4.
[6] Butylglycol acetate
[7] Butyl acetate 98% strength
[8] Solids content

TABLE 4

Test results of the applied topcoats
KA1' (novel) and KV1' and KV2' (comparison)

|  | KA1' | KV1' | KV2' |
|---|---|---|---|
| Adhesion | 17 | 25 | 17 |
| Viscosity (s) | 20 | 21 | 15 |
| After 2 h | 26 | 25 | 18 |
| Dust-dry (min) | 100 | 100 | 130 |
| Tack-free (min) | 250 | 280 | 310 |
| Gasoline test (days) | 6 | 3 | >21 |
| Volvo test | m0/g0 | m0/g0 | m0/g0 |
| Color (comparison) |  |  |  |
| Viewed straight on | identical | identical | darker |
| Viewed at an angle | identical | identical | lighter |
| Assessment | satisfactory | satisfactory | unsatisfactory |

Key to Table 4
The tests indicated in Table 4 are carried out as follows:
Adhesion: Testing with the high-pressure cleaner
High pressure cleaner
80 bar pressure
Throughput 800 /h
Temperature: cold
Distance of the nozzle from the test panel: 5 cm The test coating material is applied as described in Example 2.6. to a 40×60 cm steel panel and dried at 60 degrees C for 30 minutes. After storage at room temperature for 7 days, a triangle with a lateral length of 10 cm is cut through the coats of paint using a knife. The cut must be made down to the substrate. Subsequently, the sides of the triangle are subjected to the jet of the high-pressure cleaner for 10 s in each case.

Evaluation: a metal lattice cut into squares, having a mesh size of ½ inch (1.3 cm) and a total edge length of 6 inches (15.4 cm) (144 squares), is laid over the triangle. A count is made of each square in which there is a loss of adhesion between clearcoat and basecoat.

Viscosity:
The viscosity is measured in each case as the flow time from the DIN 4 cup at 20 degrees C.

Dust dryness:
About 15 minutes after the application of the coating material by spraying, a small sample of marine sand (3 to 4 g) is scattered on one corner of the panel. The panel is then dropped on one edge from a height of 30 cm (free fall). Dust dryness is attained when no sand adheres. The test is repeated at 15 minute intervals; shortly before dust dryness is attained, the repetition interval is shortened to 5 minutes.

Freedom from tack:
About 20 minutes after dust dryness has been attained, the coated panel is covered with a piece of paper 2 measuring about 3 cm². A small plate of hard plastic is laid on this paper, and then a weight of 100 g is placed on the plate. After exactly 1 minute, testing is carried out as in the test for dust dryness, to see whether the paper still adheres. Testing is repeated at 15-minute intervals; shortly before freedom from tack is attained, the repetition interval is shortened to 5 minutes.

Gasoline test:
As described above, the clearcoat is applied to phosphatized, coated steel panels which are coated with the filler and basecoat described above, and dried at room temperature. The first test for gasoline resistance is carried out after storage at room temperature for 24 hours.

Procedure: a wadding pad (filter grade, type T950, size 2.3 from Seitz) impregnated with 1 ml of premium-grade gasoline (lead-free), whose bottom face possesses a lattice structure, is laid on the coat of paint and subjected for 5 minutes to a weight of 100 g. The structure brought about by the swelling up of the paint surface is then assessed visually: not marked, marked, very slightly marked, slightly marked, marked [sic], heavily marked, very heavily marked. The value indicated is the period of storage at room temperature, in days, after which the gasoline test is satisfactory, i.e. no marking is visible.

Volvo Test:
Test conditions 1 cycle:
 4 h at 50 degrees C in an oven
 2 h at 35 degrees C and 95–100% rel. atmospheric humidity
 2 h at 35 degrees 95–100% rel. atmospheric humidty and 2 l of sulfur dioxide
 16 h to −30 degrees in a deep-freeze cabinet Wash panel with water and dry Evaluation:
 Degree of blistering in accordance with DIN 53209
 Cracks ASTM D660
Color in accordance with DIN6174:
Standard illuminant D
3 angle measuring instrument MMK111, Datacolor The base color used was a mixture of the commercial base colors from BASF L+F, (Munster-Hiltrup, Germany), series 54. A mixture of 80 parts by weight of 54M 99/9 Basisfarbe Aluminium superfein and 20 parts by weight of 54M 552 Basisfarbe Helioblau was employed. The test coating material is applied as described in Example 2.6. to a 40×60 cm steel panel and dried at 60 degrees C for 30 minutes. After storage at room temperature for 24 h, the color test is carried out.

The panels are assessed under an Osram Universal white neon lamp:
1. Viewed straight on: the panels are compared with the standard panel (coated with the clearcoats KA1, KV1 and KV2) at an angle of about 20 degrees to the vertical.

What is claimed is:

1. Coating composition comprising
   at least one hydroxyl-containing binder component (A), and
   at least one crosslinking agent (B),
characterized in that the binder component (A) is a hydroxyl-containing polyacrylate resin (A) obtained by free-radical polymerization of
   (a) from 5 to 80% by weight of one or more monomers selected from the group consisting of a cycloaliphatic ester of methacrylic acid, a cycloaliphatic ester of acrylic acid, and mixtures thereof,
   (b) from 10 to 50% by weight of one or more monomers selected from the group consisting of a hydroxyl-containing alkyl ester of methacrylic acid, a hydroxyl-containing alkyl ester of acrylic acid, or mixtures of such monomers,
   (c) from 1 to 25% by weight one or more monomers which are selected from those monomers having at least two free-radical-polymerizable, olefinically unsaturated double bonds and which are different from (a) and (b),
   (d) from 0 to 25% by weight of one or more hydroxyl-containing ethylenically unsaturated monomers which are different from (a), (b), and (c), or a mixture of such monomers,
   (e) from 5 to 80% by weight of one or more monomers which are different from (a), (b), (c), and (d), and are selected from the group consisting of an aliphatic ester of methacrylic acid, an aliphatic ester of acrylic acid and a mixture of such monomers,
   (f) from 0 to 40% by weight of a vinyl-aromatic hydrocarbon which is different from (a), (b), (c), (d) and (e), or a mixture of such monomers, and
   (g) from 0 to 40% by weight of a further ethylenically unsaturated monomer which is different from (a), (b), (c), (d), (e), and (f), or a mixture of such monomers,
wherein the resulting polyacylate resin (A) has an OH number of from 60 to 180 mg of KOH/g, the sum of the proportions of components (a) to (g) always being 100% by weight and the monomers or monomer mixture employed as component (b) only being those which, on polymerization of the respective monomer alone, produce a resin having a glass transition temperature of from $-10$ to $+6$ degrees C° or from $+60$ to $80$ degrees C°, and further characterized in that crosslinking agent (B) comprises at least one di-and/or polyisocyanate.

2. The coating composition of claim 1, characterized in that component (b) is selected from the group consisting of 3-hydroxypropyl methacrylate, 3-hydroxypropyl acrylate, 2-hydroxypropyl methyacrylate, 2-hydroxypropyl acrylate, and mixtures thereof.

3. The coating composition of claim 1, characterized in that component (c) comprises a compound of the formula I:

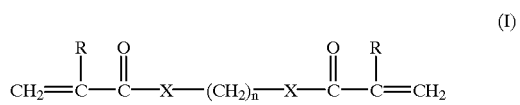

where:
   R is H or methyl,
   X is O, NH, $NR_1$ where $R_1$=C1- to C10-alkyl, or S, and
   n is 2 to 8.

4. The coating composition of claim 1, characterized in that component (e) is selected such that polymerization of component (d) alone produces a polyacrylate resin and/or polymethacrylate resin having a glass transition temperature of from 70 to +120 degrees C°.

5. The coating composition of claim 4, characterized in that component (e) is selected from the group consisting of n-butyl methacrylate, n-butyl acrylate, tert-butyl methacrylate, tert-butyl acrylate, isobutyl methacrylate, isobutyl acrylate, methyl methacrylate, methyl acrylate, 2-ethylhexyl methacrylate, 2-ethylhexyl acrylate, lauryl methacrylate, lauryl acrylate, stearyl methacrylate, stearyl acrylate, ethyltriglycol methacrylate, furfuryl methacrylate, furfuryl acrylate and mixtures thereof.

6. The coating composition of claim 1, characterized in that component (a) is selected from the group consisting of cyclohexyl methacrylate, cyclohexyl acrylate, isobornyl methacrylate, isobornyl acrylate, 4-tert-butylcyclohexyl acrylate, 4-tert-butylcyclohexyl methacrylate, and mixtures thereof.

7. The coating composition of claim 1, characterized in that polyacrylate resin (A) has an OH number of from 100 to 150 mg of KOH/g.

8. The coating composition of claim 1, comprising at least one further binder which is different from the acrylate resin (A).

9. A process for the producing a multicoat protective and/or decorative coating on a substrate surface, comprising
   (1) applying a pigmented basecoat to a substrate surface,
   (2) forming a polymer film from the pigmented basecoat applied to the substrate surface in the foregoing step (1),
   (3) applying to the polymer film a transparent topcoat containing the hydroxyl-containing binder component (A) of claim 1 and a crosslinking agent (B), and then
   (4) curing the polymer film and applied transparent topcoat film together.

10. A process for the repair of a previously cured coated substrate, comprising applying to a previously applied cured coated substrate the coating composition of claim 1.

11. The coating composition of claim 1, wherein component (a) is selected from the group consisting of 4-tert-butylcyclohexyl acrylate, 4-tert-butylcyclohexyl methacrylate, and mixtures thereof.

12. The coating composition of claim 1, characterized in that the coating composition contains as crosslinking agent (B) at least one member selected from the group consisting of diisocyanates which contain one or more isocyanurate groups, polyisocyanates which contain one or more isocyanurate groups, and mixtures thereof.

13. The coating composition of claim 1 further comprising at least one further binder selected from the group consisting of at least one further polyacrylate resin which is different from polyacrylate resin (A), at least one polycondensation resin, and mixtures thereof.

* * * * *